United States Patent
Rodin et al.

(10) Patent No.: US 7,620,007 B2
(45) Date of Patent: Nov. 17, 2009

(54) ALLOCATING RESOURCES TO NEWLY CONNECTED NETWORK ELEMENTS

(75) Inventors: Gunnar Rodin, Bettna (SE); Antonius Saers, Stockholm (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 665 days.

(21) Appl. No.: 10/479,292

(22) PCT Filed: May 29, 2002

(86) PCT No.: PCT/EP02/05923

§ 371 (c)(1), (2), (4) Date: Mar. 16, 2004

(87) PCT Pub. No.: WO02/100122

PCT Pub. Date: Dec. 12, 2002

(65) Prior Publication Data

US 2004/0190521 A1   Sep. 30, 2004

(30) Foreign Application Priority Data

Jun. 4, 2001   (GB) ................. 0113530.0

(51) Int. Cl.
*H04W 4/00* (2006.01)

(52) U.S. Cl. .................. 370/328; 370/442; 370/458; 370/459; 455/422.1; 455/460; 455/452.1; 709/237

(58) Field of Classification Search .............. 370/310.2, 370/328–338, 350–352; 455/422.1, 460; 709/237

See application file for complete search history.

(56) References Cited

U.S. PATENT DOCUMENTS

| 4,592,044 | A |   | 5/1986 | Ferenc |
| 4,763,323 | A | * | 8/1988 | Nelson et al. ............... 370/449 |
| 5,402,470 | A |   | 3/1995 | DeVaney |
| 5,438,568 | A | * | 8/1995 | Weisser, Jr. ................. 370/389 |
| 5,453,977 | A |   | 9/1995 | Flammer, III et al. |
| 5,566,227 | A |   | 10/1996 | DeVaney |
| 5,617,467 | A |   | 4/1997 | Bacher et al. |
| 5,619,551 | A |   | 4/1997 | Yahagi |
| 5,675,629 | A | * | 10/1997 | Raffel et al. ............. 455/552.1 |
| 5,715,245 | A |   | 2/1998 | Suonvieri |
| 5,799,252 | A |   | 8/1998 | Nakagoshi et al. |

(Continued)

FOREIGN PATENT DOCUMENTS

EP   0858235 A1   8/1998

(Continued)

*Primary Examiner*—Lester Kincaid
*Assistant Examiner*—Sayed T Zewari
(74) *Attorney, Agent, or Firm*—Roger S. Burleigh

(57) ABSTRACT

A method of establishing a connection between network elements is disclosed, in which, when a network element is newly connected, it enters a first mode (the seek mode), in which it attempts to establish the required network connections. In the first mode, the network element continuously sends short messages, once in each time slot. The second mode of operation of the network elements (the standby mode), in which they already have established connections, involves listening for such messages being sent from newly connecting network elements. On detection of such a message, therefore, the already connected network element sends a reply message to the newly connected network element, and the two network elements establish a connection between them.

12 Claims, 3 Drawing Sheets

U.S. PATENT DOCUMENTS

| | | |
|---|---|---|
| 6,014,563 A | 1/2000 | Szabo |
| 6,574,208 B1 * | 6/2003 | Matturi et al. .............. 370/338 |
| 6,744,762 B1 * | 6/2004 | Hojo .......................... 370/392 |

FOREIGN PATENT DOCUMENTS

| | | |
|---|---|---|
| EP | 0886447 A1 | 12/1998 |
| WO | WO 97/16931 | 5/1997 |
| WO | WO 98/48583 | 10/1998 |
| WO | WO 99/26436 | 5/1999 |
| WO | WO 99/56485 | 11/1999 |
| WO | WO 00/25540 | 5/2000 |
| WO | WO 00/25541 | 5/2000 |
| WO | WO 00/25542 | 5/2000 |
| WO | WO 00/44191 | 7/2000 |

* cited by examiner

ALLOCATING RESOURCES TO NEWLY CONNECTED NETWORK ELEMENTS

TECHNICAL FIELD OF THE INVENTION

This invention relates to a procedure which can be used when connecting a new network element into a network, such as a telecommunications network.

BACKGROUND OF THE INVENTION

Radio telecommunications networks include large numbers of components, which must be connected together. As examples, a network will typically include radio base stations (RBS) and base station controllers (BSC), which are connected together through routers and digital cross-connect (DXC) equipment. These components are generally referred to herein as network elements (NE).

Connections between network elements are typically E1/T1 connections, and are divided into frames, each frame including a plurality of time slots. E1/T1 frames consist of 32 or 24 time slots, respectively. If a connection uses all 32/24 time slots, this is referred to as a whole E1/T1 connection.

However, in many cases, the connection between two network elements is some fraction of an E1/T1 connection. This situation arises in particular when two network elements are connected through a digital cross-connect device, since this can multiplex links to two different network elements onto a single link to a third network element.

It is also necessary to consider whether the equipment supports time slot integrity. If so, each time slot has the same delay when passing through the equipment. However, some devices do not support time slot integrity, that is different time slots have different delays. In that case, for many applications, the differences must be compensated for. One example is if communication with the Internet Protocol (IP) protocol suite is used.

When establishing a connection between two network elements, for example when adding a new network element, it is advantageous to allocate the largest available number of time slots. Also, it would be advantageous for the set up procedure to be automated, in order to reduce the requirement for operator intervention during the set up procedure.

WO99/56485 describes a system in which a base station controller controls and monitors the installation of network elements, and automatically allocates telecommunications capacity for the use of the network elements. The required capacity is allocated from a group of unallocated consecutive time slots on a communications link, one of those time slots being used as a communication channel, for the base station controller to send time slot allocation information to the network element.

However, the need to use one of the time slots as a communication channel in this way reduces the bandwidth available for transmitting data between the network elements.

Moreover, in order for the base station controller to be able to allocate the available capacity, it must have information about the time slot connections of the cross connects.

SUMMARY OF THE INVENTION

In accordance with the present invention, there is provided a method of establishing a connection between network elements, in which, when a network element is newly connected, it enters a first mode (the seek mode), in which it attempts to establish the required network connections. In the first mode, the network element continuously sends short messages, once in each time slot. Each message defines the time slot and the sending network element.

The second mode of operation of the network elements (the standby mode), in which they already have established connections, involves listening for such messages being sent from newly connecting network elements. On detection of such a message, therefore, the already connected network element sends a reply message to the newly connected network element, and the two network elements establish a connection between them. Network elements in the second mode of operation preferably also transmit messages at regular, infrequent, intervals. Therefore, as part of the first mode of operation, a network element listens for messages sent from other network elements.

This procedure has the advantage that it allows connections to be set up quickly and reliably, maximizing the use of the available time slots.

Further, it allows the establishment of suitable connections, without needing knowledge of the time slot connections in cross-connect devices in the network. According to another aspect of the present invention, there is provided a network element which is adapted to operate in the two modes described above.

DETAILED DESCRIPTION OF PREFERRED EMBODIMENTS

Figure 1:
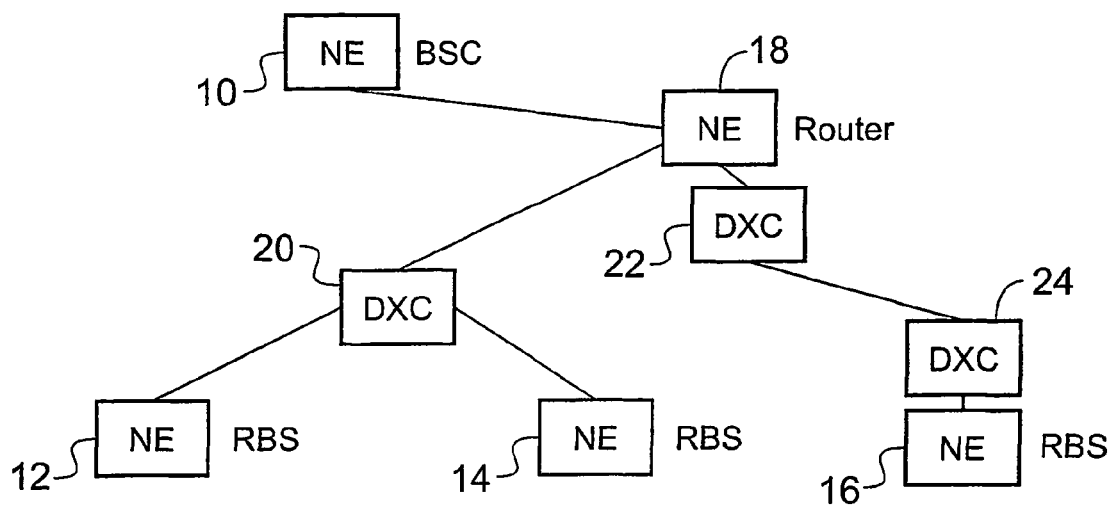
FIG. 1 shows a network, operating in accordance with the method of the present invention.

FIG. 1 shows a radio communications network, in which the present invention can be implemented. It will of course be appreciated that FIG. 1 shows only a very small part of a much larger network, only a small number of devices being illustrated in the interests of clarity.

Thus, in the network of FIG. 1, a base station controller (BSC) 10 is connected to three radio base stations (RBSs) 12, 14, 16 through an internet protocol (IP) router 18, and three cross-connection devices (DXCs) 20, 22, 24.

The BSC, the RBSs and the router are referred to generally herein as network elements (NEs).

Figure 2A:
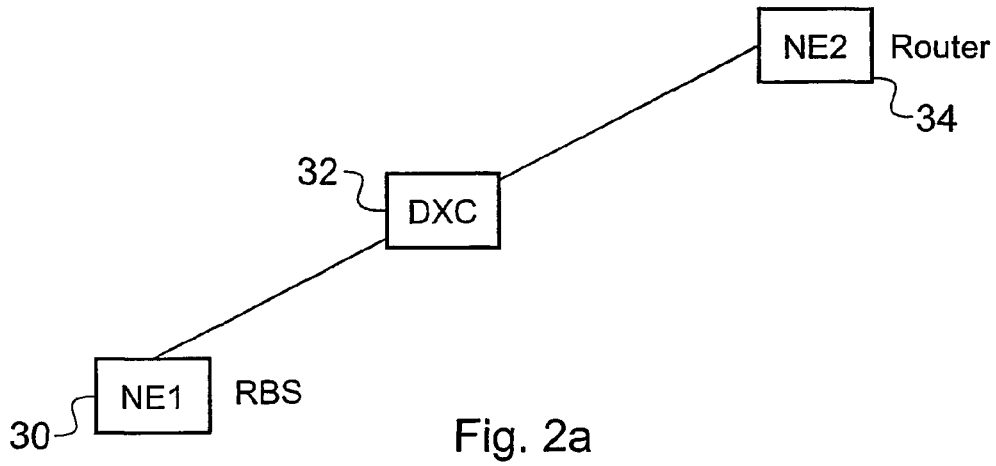
FIG. 2 illustrates the connections between two network elements.
Figure 2B:
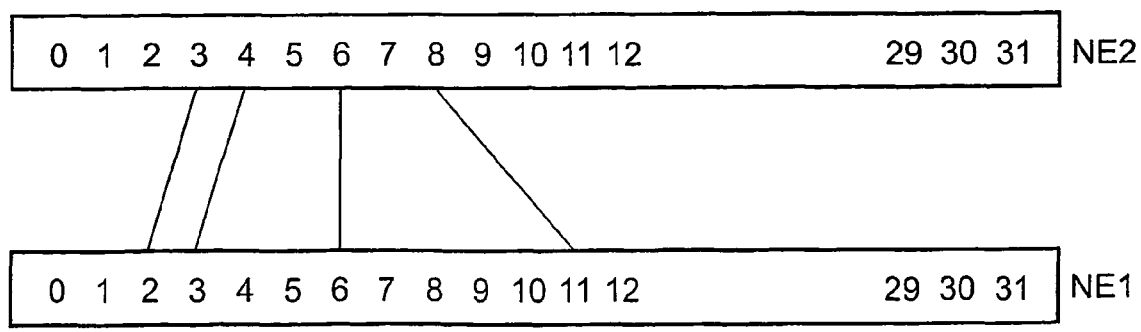

FIG. 2 illustrates how two network elements may be connected together. Specifically, FIG. 2a shows the physical connections between them, while FIG. 2b illustrates the logical connections. Thus, a first network element (NE1) 30, which in this case is a radio base station, is connected through a digital cross-connect device 32 to a second network element (NE2), which in this case is an IP router.

As shown in FIG. 2b, a full rate connection between two network elements would contain 32 time slots in each frame. However, fractional connections are also possible. In this case, time slots 2, 3, 6, 11 on the first network element 30 are connected to time slots 3, 4, 6, 8 on the second network element 34. Thus, the connection between these two network elements is at only ⅛ of the full rate. It is then possible for the two network elements to be connected to other devices. For example, the router 34 may be connected through the cross-connect device 32 to one or more other radio base stations.

The present invention is concerned with a situation in which a network element is newly added to a network, and provides a procedure whereby the required connections can be set up automatically. In general terms, it is advantageous for the connection between any two network elements to use the largest available bandwidth. However, when a network element is newly added, for example when a radio base station is switched on for the first time, it will generally have no information about the bandwidth available for connection to other network elements.

The method is applied for all ports of a Network Element (NE). For the NE there will be two modes of operation, namely a seek mode and a standby mode. At start up, the NE is in a seek mode, and tries to establish connections over the ports. If the attempt to establish a connection succeeds, the NE will, within a certain time, enter the standby mode.

In the seek mode, the NE continuously sends short messages, one message being sent on each time slot on all ports. The messages are called Inter-Equipment Connection Procedure messages (IECP-messages).

Each IECP message consists of:

a High-Level Data Link Control (HDLC) frame with

| | |
|---|---|
| NE identifier | 2–8 bytes |
| Port number | 1 byte |
| Time slot number | 1–2 byte |
| HDLC framing: flag + CRC | 3 bytes |

Thus, the message will consist of a NE identifier, eg. a serial number, a port number defining from which port in the NE the message is sent, and a time slot number defining which time slot is used for this message. The messages are framed in HDLC framing. The time slot number may be a number that runs consecutively over all time slots on all ports or is a combination of a port number and a time-slot-in-port number.

In seek mode there will be one unique message sent on each available time slot. If the NE for example has two E1 then 2×31 messages will be sent in parallel (each E1 has 32 time slots but time slot 0 cannot be used). The messages sent on the time slots will be repeated during the whole time that the NE is in seek mode.

Because, for each different time slot, exactly the same message is repeated in every frame, the checksum in the HDLC message has to be calculated only once when the first message is sent.

While the NE sends the IECP messages, it listens for received information on the ports.

Figure 3:
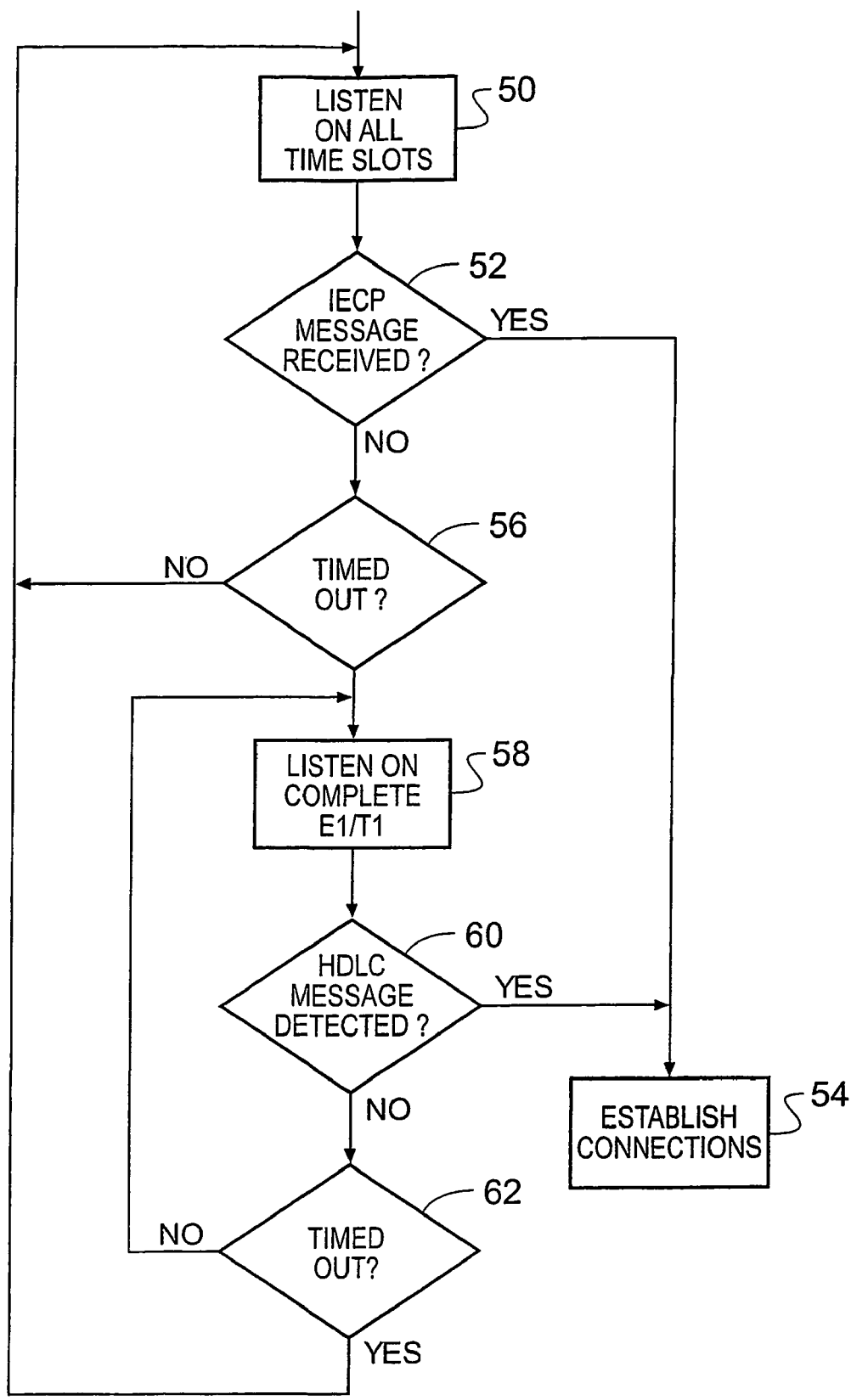
FIG. 3 is a flow chart, illustrating a procedure in accordance with the present invention.

FIG. 3 shows this listening procedure carried out in a first network element (NE1), when it is in the seek mode, having been newly connected to the network.

In step 50, the network element begins listening, on all of the time slots in parallel, for any HDLC messages received on individual time slots. At step 52, the network element determines periodically whether any IECP message has been detected.

If one or more IECP reply messages are detected, this means that NE1 is connected to one or more time slots on one NE (e.g. NE2), or that it is connected to multiple NEs (e.g. NE2, NE3 etc) which are sending IECP messages. By examining the received IECP reply messages, the NE1 can determine which time slots are connected to NE2. These time slots will constitute one channel from NE2 to NE1. It should be noted that it is not a necessary requirement that the time slots should be on one port.

Figure 4:
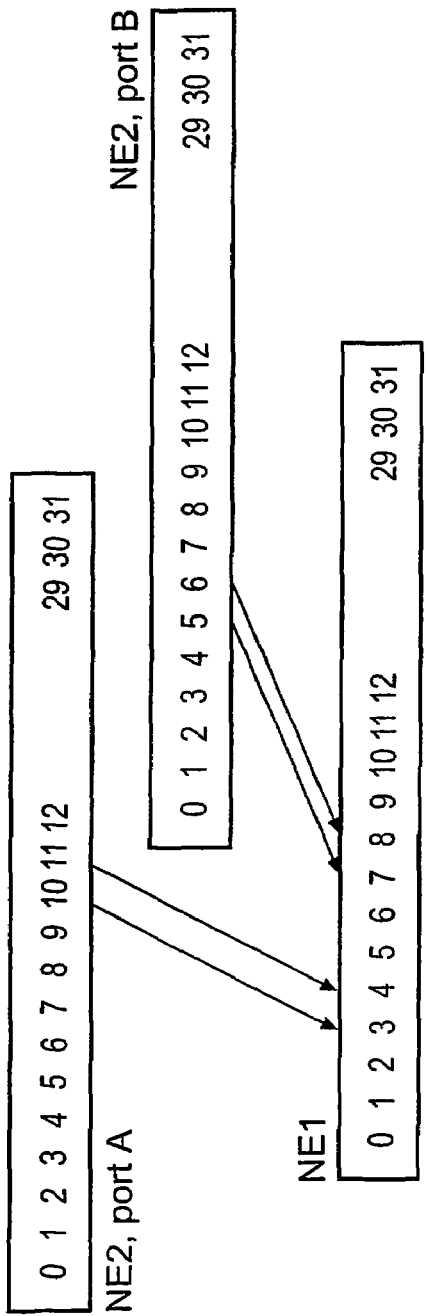
FIG. 4 shows the connections between two network elements at a first stage in the procedure according to the invention.
Figure 5:
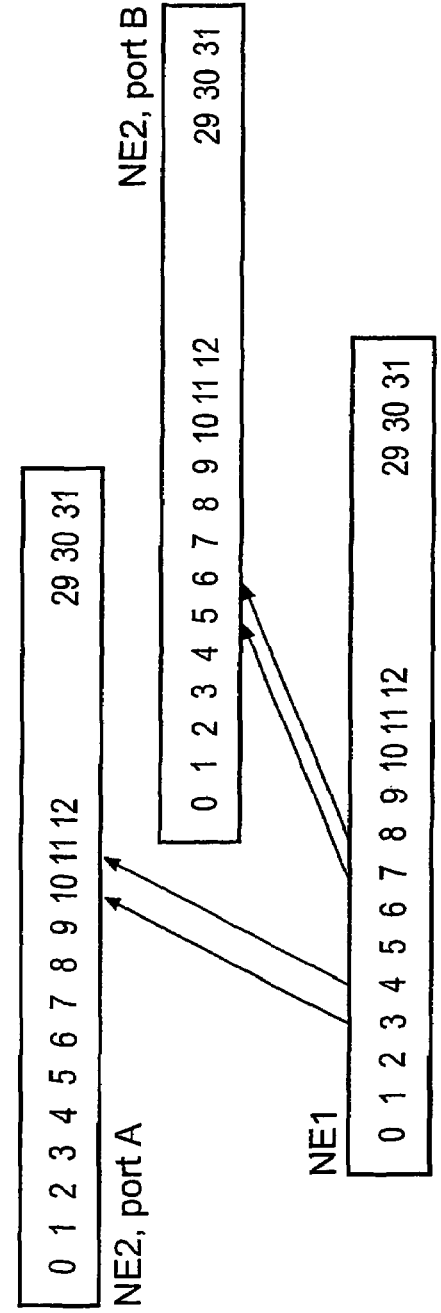
FIG. 5 shows the connections between the two network elements at a second stage in the procedure.

When time slots are connected through a cross connect device, all time slots are the same in both directions as standard. For example, in the event that NE1 receives IECP messages on port A, time slots 3, 4, 7 and 8 and these messages are sent from NE2 port A on time slots 10 and 11 and port B, time slot 5 and 6, (as shown in FIG. 4) then NE2 will receive IECP messages on port A time slots 10 and 11 and port B, time slot 5 and 6, sent from NE1 port A, time slots 3, 4, 7 and 8, respectively (as shown in FIG. 5).

When a channel is detected in step 52, the procedure passes to step 54, in which NE1 handshakes the validity of the channel, with NE2 checking that they have detected the same number of time slots and that they use the same time slots in both directions (one single time slot can be used for this communication). Thereafter, NE1 and NE2 will optionally check time slot integrity, as discussed in more detail below. The two network elements NE1 and NE2 will then start establishing, for example, a Point-to-Point Protocol (PPP) connection according to the PPP standard.

There is now established a communications channel between the two network elements, comprising all of the available time slots. This minimises the delays for data packets which are to be transferred between the network elements.

If the first network element NE1 detects IECP messages from another network element in addition to the second network element NE2, it will do the same negotiation procedure with that network element. However, if no further connection is found during a time internal of, for example, one second, the network element will enter the standby state.

If, however, no IECP message has been detected in step 52, the procedure passes to step 56, in which it is tested whether a first time period, for example 100 milliseconds, has expired.

If this first time period has not expired, the network element continues listening on all the time slots, as the procedure returns to step 50.

If, on the other hand, the first time period has expired, the procedure passes to step 58, in which the network element listens for HDLC messages received using the E1/T1 as a single 31/24 time slot broad channel. At step 60, the network element determines periodically whether any HDLC message has been detected.

If the first network element NE1 detects an HDLC message, this probably means that the network element NE2 which sent that message is a network element, which is not equipped to use the Inter-Equipment Connection Procedure IECP described herein, but is a standard router that tries to start a PPP connection. In that event, the procedure passes to step 54, and NE1 will start to establish a PPP connection according to the PPP standard.

If no HDLC message is detected in step 60, the procedure passes to step 62, in which it is determined whether the network element has been listening on the complete channel for more than a second time period, for example, 300 milliseconds. If not, the procedure returns to step 58, and the network element continues listening on the complete channel.

If, on the other hand, it is determined in step 62 that the second time period has expired, the procedure returns to step 50, and the network element resumes listening on all time slots in parallel, for messages received on individual time slots.

Thus, as described above, once a network element has established a connection with at least one other network element, it will enter a standby state, in which unused time slots will be scanned. This scanning should take place with a low frequency, in order to minimise the influence on the computing capacity of the network element.

If an IECP message is found during the scanning in the standby state, all unused time slots will be searched immediately to find any more IECP messages, and suitable reply messages sent, in order to establish connection with the new NE at once.

In one preferred embodiment of the present invention, a network element in standby mode sends IECP messages continuously in standby mode. This has the advantage that a newly connecting network element will receive an IECP message very soon after connecting.

However, an alternative embodiment is possible, in which the network element in standby mode does not send IECP messages continuously, but only at relatively infrequent intervals. One possible use of the invention is when two network elements already have a connection to a network, but a direct connecting cable is set up between them for the first time. In that case, these two network elements will both be in standby mode when the cable is connected. In order to be sure that these two network elements will be able to establish a connection between them, it is necessary to select appropriate durations and frequencies for the periods when network elements in the standby state scan the time slots for received IECP messages, and the periods when network elements in the standby state send IECP messages. In some cases, it is possible that a network element in the standby mode will periodically scan the time slots for received IECP messages, but will send IECP messages only in response to a message received from another network element.

There is described above a system in which a newly connected network element sets up a configuration when it is connected. However, in a preferred embodiment of the invention, it is advantageously possible to pre-configure the NE. For example, a network element could be pre-configured such that it will always communicate on specified time slots of a particular port. This can be used if the network configuration is known in advance.

The system described above assumes that a network element uses the IECP to set up a configuration whenever it is connected to the network. However, in one embodiment of the invention, the NE can be such that, when it has been automatically configured using the IECP, and power is subsequently shut off temporarily, the old configuration can be used directly at start up. Alternatively, the NE can be set such that it will go through the IECP procedure again, even in this situation, to be sure that the network configuration did not change during the period that the power was off.

Since, if the connection over a link is disconnected temporarily, it may be important that the connection is established as soon as possible, the preferred embodiment of the invention is that the configuration existing before the interruption should be remembered, and the connection should be re-established using the same configuration as before the interruption. Only if this re-establishment does not succeed should the IECP procedure be used to determine a new configuration.

As mentioned above, many digital cross connect devices provide time slot integrity when an E1/T1 connection is transferred, meaning that all time slots are delayed equally. Not all equipment provides time slot integrity, but, in IP applications it is important to have time slot integrity, and so, in preferred embodiments of the invention, the Inter-Equipment Connection Procedure IECP provides a method to detect the various delays so as to be able to compensate for them.

As one example, a first network element NE1 can send the same HDLC message (message 1) to a second network element NE2, on each time slot in the channel between NE1 and NE2, starting at the same time frame on all time slots. Immediately afterwards, a second message (message 2) is sent on all time slots, and so on. Each of the messages includes a sequence counter containing the message number.

At the receive side, that is, in NE2, it is then simple to compare the receipt times of the corresponding messages, for example all of the second messages. If the message on time slot 1 arrives one frame before the message on time slot 2, this means that time slot 2 is delayed one frame between NE1 and NE2.

The inverse of the measured delays can then be introduced in the receiver to compensate for the delays.

This method can be combined with the IECP seek mode.

As an alternative to the above method of detecting the various delays, one byte binary numbers are sent on all time slots. In the first frame all ones are sent, in the second all twos, and so on. Again, it will be simple to detect the different delays at the receiver side.

According to the present invention, a network element can also determine a desired mode of operation, as part of the automatic connection procedure. For example, if the NE is a radio base station that can be running either IP based BSC to RBC communication or standard STM based communication (Abis), depending on the network, the choice of mode can be determined by the network. The network element can be configured to search also on one time slot for a certain LapD message. This message will indicate that the connection is to be used for an Abis connection. The wanted LapD message is a CF message. If a CF message is found the NE will stop further searching, leave the IECP mode and enter a standard Abis program. Thus, if the equipment uses LapD signalling, this can be specified when establishing connections.

Although the invention has been described so far with reference to an E1/T1 connection between network elements, it is also applicable to 8 Mbit/s, 34 Mbit/s, or higher order transmission systems, for example with PDH or SDH connections.

Thus, the method according to the invention will support automatic configuration in most cases if there is an equipment that supports IECP on the other side of the communication link. This applies whether the communication link only uses some time slots, or whether it is a complete E1/T1 (or higher order) communication links, and also allows automatic selection between IP BSS mode and Classic BSS mode.

Moreover, if a network element which can operate the IECP is connected to a NE without IECP, it can, if both network elements are using the IP protocols, establish a connection conforming to current IETF and ITU-T standards, although a manual procedure is necessary in this case if not all time slots are used.

It will be noted that, in most modern network elements, the method is a software solution and does not require any hardware adaptation.

Moreover, the method allows a fast establishment of a connection. If there are two network elements that are establishing the connection, this can be done in less than one second. If the NE spends up to 100 ms scanning all the time slots, and up to 300 ms scanning the whole E1/T1, it will detect the other NE within 200-400 ms. Ample time is then available to handshake and go to the standby state.

When an NE is installed, the communication to other NEs can, in many cases, start immediately after the IECP method is completed, even if the presence and configuration of intervening cross connects is unknown. This makes it possible to check that the communication is working at the time of installation, even if there is no contact to the network supervisory equipment.

Further, the use of the method will diminish the requirement on the person installing a network element to know the network topology, and, if the network is reconfigured and the bandwidth between the network elements is changed, no visit to the NE site is necessary in most cases.

Thus, the installation of a network element will be easier and faster in several ways.

The invention claimed is:

1. A method of establishing a connection between a first network element and at least one other network element, the method comprising, on first connecting the first network element:
   sending signals from the first network element in each time slot of each frame of a channel, wherein each said signal identifies the first network element and the respective time slot;
   detecting messages sent by another network element;
   determining which time slots are connected to the other network element, the determined time slots constituting a channel between the first network element and the other network element; and
   establishing a connection using the constituted channel and the same determined time slots in both directions between the first network element and the other network element.

2. A method as claimed in claim 1, wherein the step of establishing the connection comprises handshaking between the first network element and the other network element and establishing a connection using the Point-to-Point Protocol.

3. A method as claimed in claim 1, wherein the signal further identifies a port of the first network element.

4. A method as claimed in claim 1, wherein the signal further includes a check value.

5. A method as claimed in claim 1, wherein the steps of detecting messages and establishing the connection comprise:
   listening on every time slot for a message, sent from another network element; and
   establishing a connection on each time slot on which a message is received; and
   further comprising, if no message is received within a first time period:
   listening on the whole channel for any received messages; and
   establishing a connection on the whole channel in response to any such received messages.

6. A method as claimed in claim 1, further comprising, after establishing a connection, entering a standby mode, including listening for any messages sent from other network elements.

7. A method as claimed in claim 6, further comprising, in the standby mode, sending reply messages in response to any detected messages sent from other network elements.

8. A method as claimed in claim 6, further comprising, in the standby mode, sending messages at predetermined time intervals.

9. A method as claimed in claim 1, further comprising sending signals from the first network element at the same time position within each time slot, and detecting received signals to test for time slot integrity over the connection.

10. A method as claimed in claim 1, further comprising:
    storing the details of any established connection; and
    reestablishing a connection using the stored details, in the event of an interruption of power.

11. A method as claimed in claim 1, further comprising determining a required mode of operation on the connection.

12. A method as claimed in claim 1, wherein the step of establishing a connection between the first network element and the other network element comprises establishing a communications channel which comprises the time slot in which reply messages are sent by the other network element.

* * * * *